United States Patent
Laso-Leon et al.

(10) Patent No.: US 9,239,634 B2
(45) Date of Patent: Jan. 19, 2016

(54) COMPUTER EQUIPMENT COMPRISING A TRACKBALL AND METHOD FOR DRIVING THE COMPUTER EQUIPMENT

(71) Applicant: THALES, Neuilly-sur-Seine (FR)

(72) Inventors: Enrique-Roberto Laso-Leon, Toulouse (FR); Amandine Audouy, Toulouse (FR); Mathieu Le Merrer, Toulouse (FR)

(73) Assignee: Thales (FR)

( * ) Notice: Subject to any disclaimer, the term of this patent is extended or adjusted under 35 U.S.C. 154(b) by 239 days.

(21) Appl. No.: 13/720,845

(22) Filed: Dec. 19, 2012

(65) Prior Publication Data

US 2013/0154936 A1    Jun. 20, 2013

(30) Foreign Application Priority Data

Dec. 20, 2011   (FR) ...................................... 11 03941

(51) Int. Cl.
*G06F 3/033* (2013.01)

(52) U.S. Cl.
CPC ...................................... *G06F 3/033* (2013.01)

(58) Field of Classification Search
CPC .................... G06F 2203/014; G06F 2203/015; G06F 3/04842; G06F 3/04812; G06F 3/03549; G06F 3/016
USPC .................................................. 345/157–167
See application file for complete search history.

(56) References Cited

U.S. PATENT DOCUMENTS

| | | | |
|---|---|---|---|
| 6,144,370 A * | 11/2000 | Eleyan et al. | 345/167 |
| 6,707,443 B2 | 3/2004 | Bruneau et al. | |
| 7,683,884 B2 | 3/2010 | Politzer et al. | |
| 2006/0007156 A1 | 1/2006 | Politzer et al. | |
| 2009/0018731 A1 * | 1/2009 | Grenell et al. | 701/51 |
| 2010/0207882 A1 * | 8/2010 | Bruneau et al. | 345/161 |

FOREIGN PATENT DOCUMENTS

| | | |
|---|---|---|
| DE | 19926597 A1 | 12/2000 |
| EP | 0489469 A1 | 6/1992 |
| EP | 1628176 A2 | 2/2006 |
| EP | 2017698 A1 | 1/2009 |
| EP | 2328065 A1 | 6/2011 |
| FR | 2846111 A1 | 4/2004 |
| WO | 2004038575 A2 | 5/2004 |
| WO | 2004/111818 A1 | 12/2004 |

\* cited by examiner

*Primary Examiner* — Michael Pervan
*Assistant Examiner* — Andrew Lee
(74) *Attorney, Agent, or Firm* — Baker & Hostetler LLP

(57) ABSTRACT

A computer equipment comprises a trackball used to point to objects on a screen of the equipment. A method for driving the computer equipment is also provided. The trackball comprises a moving part and a body inside which the moving part can be displaced, the computer being configured to display at least one object and a pointer on the screen. The trackball comprises means making it possible to exert a tangential force on the moving part, means driven by the computer. The computer is configured to modulate the force according to the shape of the object displayed and the position of the pointer relative to the object.

9 Claims, 4 Drawing Sheets

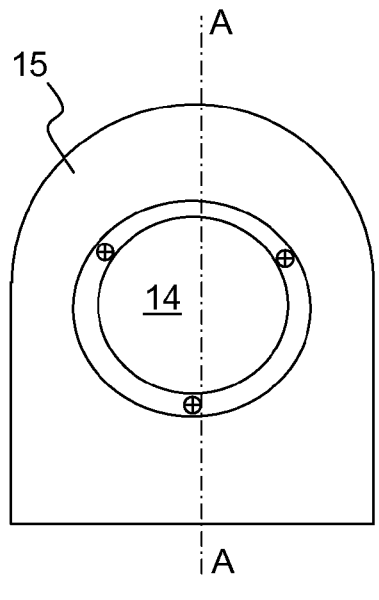
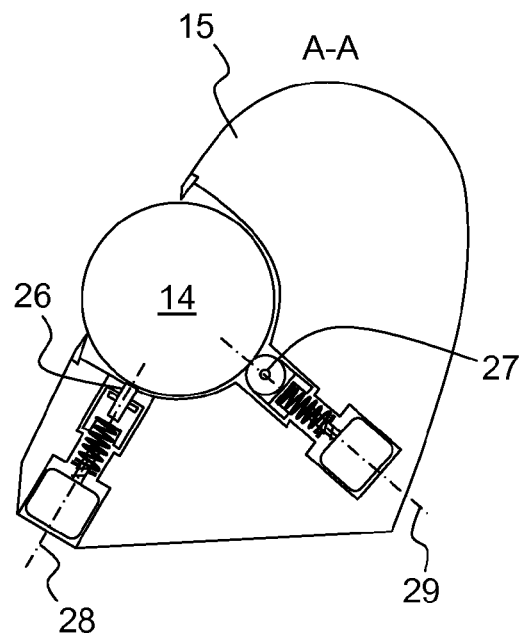
FIG.3a  FIG.3b
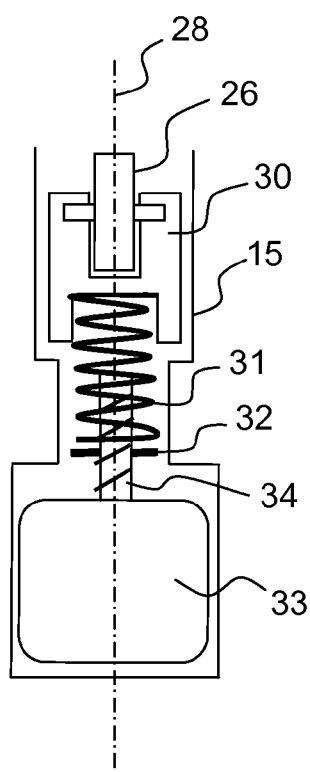
FIG.4

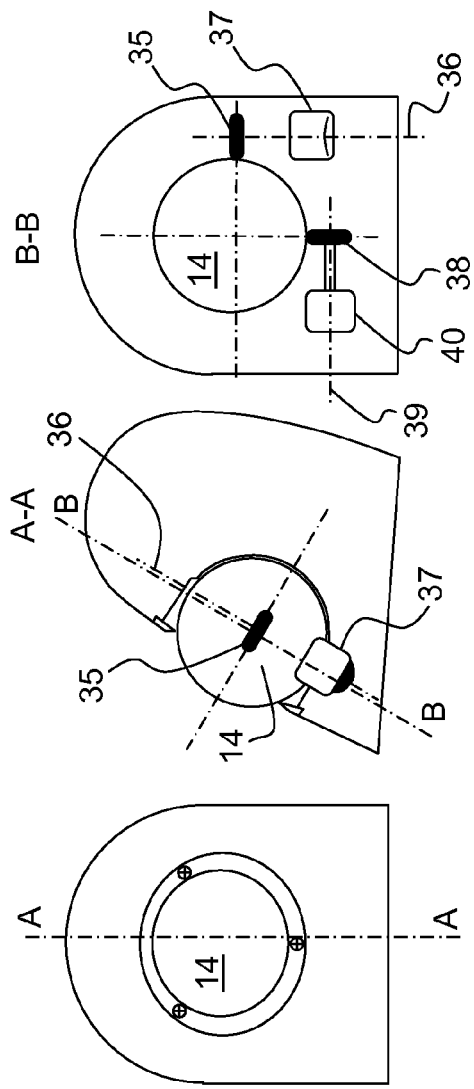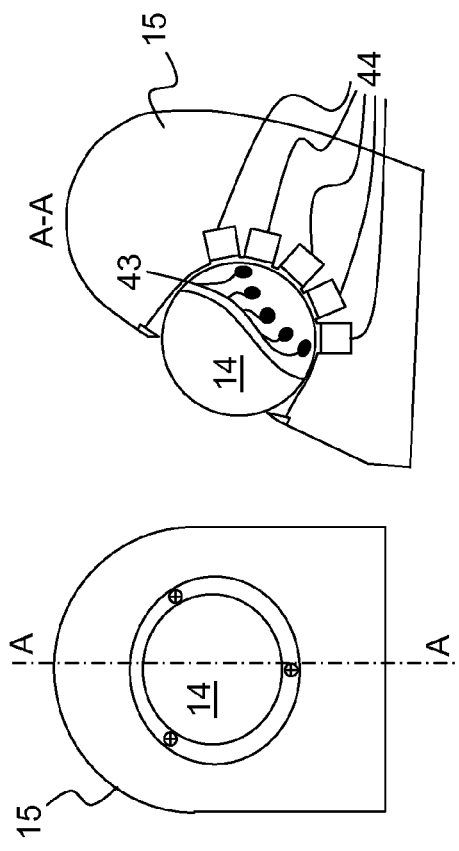

COMPUTER EQUIPMENT COMPRISING A TRACKBALL AND METHOD FOR DRIVING THE COMPUTER EQUIPMENT

CROSS-REFERENCE TO RELATED APPLICATION

This application claims priority to foreign French patent application No. FR 1103941, filed on Dec. 20, 2011, the disclosure of which is incorporated by reference in its entirety.

FIELD OF THE INVENTION

The invention relates to computer equipment comprising a trackball used to point to objects on a screen of the equipment. The invention also relates to a method for driving the computer equipment.

BACKGROUND

A trackball should be understood to be an assembly comprising a fixed body and a moving part such as, for example, a sphere. The fixed part comprises sensors making it possible to deliver information representative of the position of the moving part relative to the fixed part. The information is associated with a position on the screen by means of a computer of the equipment. An operator displaces the moving part with the fingers to reach a desired position on the screen and thus point to an object displayed on the screen.

The invention is of particular use for a trackball belonging to equipment mounted on board an aircraft. The trackball can then be used to select flight parameters displayed on the screen of the system. More generally, the trackball makes it possible to point to objects displayed on the screen.

The aircraft may be subject to turbulences which risk disturbing the pointing of the objects. More specifically, the turbulences generate vibrations that can result in uncontrolled movements of the moving part of the trackball. Even in the absence of established turbulences, slight acceleration phenomena undergone by the equipment prevent the crewmembers from pointing to a graphic area beyond a certain precision.

A common solution to this problem consists in overdimensioning on the screen the objects that can be designated so as to take into account this limitation. Consequently, this reduces the number of objects that can be displayed on a given display surface.

Attempts have also been made to stabilize the hand of the operator by creating suitable bearing surfaces. One example is given in the patent application published under the number EP 1 552 376 where the fixed part of the trackball has an ergonomic shape intended to receive the palm of the operator, hence its name "palm rest". Nevertheless, such a palm rest does not make it possible to completely steady the fingers of the operator.

Attempts have also been made to generate an attraction of the pointer in its displacement on the screen. In other words, when the pointer enters into the immediate vicinity of an object to be selected, this attraction provokes a decoupling between the movement of the pointer and the movement of the hand, which has the effect of breaking the illusion of direct designation and fairly systematically leads to the rejection of such solutions on the part of the users.

SUMMARY OF THE INVENTION

The invention aims to overcome all or part of the above-mentioned problems by proposing equipment in which a force feedback is generated, this feedback corresponding to the shape of the objects displayed. The operator then feels a force feedback sensation similar to that obtained on pressing a button. It is possible to adapt the force feedback to approach a button whose bearing surface is concave. The finger of the operator is then led towards the centre of the button.

To this end, the subject of the invention is computer equipment comprising a trackball, a screen and a computer, the trackball comprising a moving part, and a body inside which the moving part can be displaced, the trackball delivering to the computer information on the position of the moving part relative to the body, the computer being configured to display at least one object and a pointer on the screen, the position of the pointer being dependent on the information delivered by the trackball, characterized in that the trackball comprises means making it possible to exert a tangential force on the moving part, means driven by the computer, in that the computer is configured to modulate the force according to the shape of the object displayed and the position of the pointer relative to the object.

Another subject of the invention is a method for driving computer equipment according to one of the preceding claims, characterized in that it consists in determining a value of the tangential force according to a three-dimensional modelling of a surface of the object, the modelling defining, for different points of the surface of the object, an angular orientation of the surface of the object relative to the plane of the screen, and in that the tangential force changes according to the sine of the angle that the surface of the object forms with the plane of the screen.

BRIEF DESCRIPTION OF THE DRAWINGS

The invention will be better understood, and other advantages will become apparent, on reading the detailed description of an embodiment given as an example, the description being illustrated by the appended drawing in which:

FIGS. 3a, 3b and 4 represent a first variant of means making it possible to exert a tangential force that can be modulated on the moving part;

FIGS. 5a, 5b and 5c represent a second variant of means making it possible to exert a tangential force that can be modulated on the moving part;

FIGS. 6a and 6b represent an alternative to the second variant;

In the interests of clarity, the same elements will bear the same references in the different figures.

DETAILED DESCRIPTION

Figure 1:
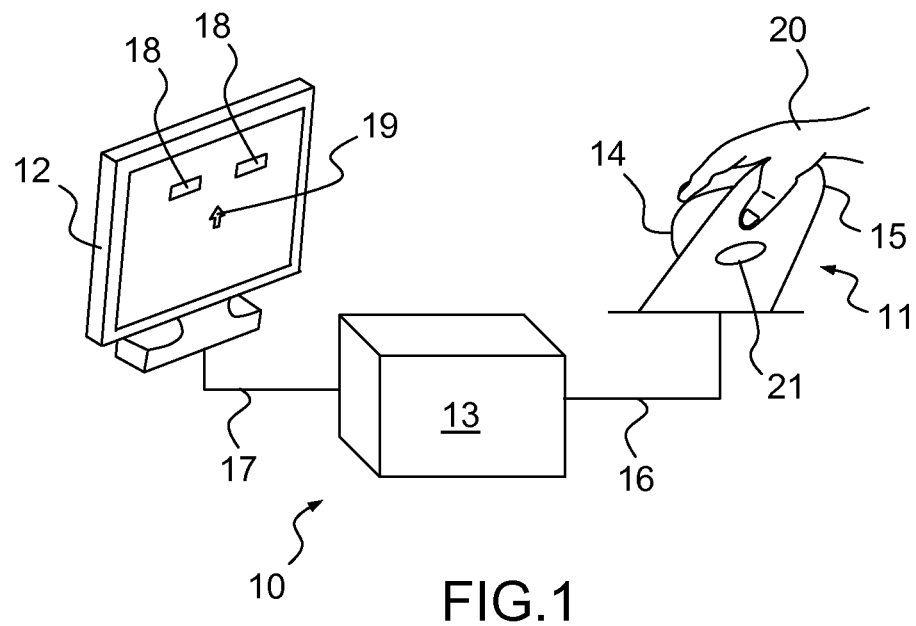
FIG. 1 represents computer equipment implementing the invention, this equipment comprising a trackball, a screen and a computer.

FIG. 1 represents computer equipment 10 comprising a trackball 11, a screen 12 and a computer 13. The trackball 11 comprises a moving part 14, such as, for example, a sphere, and a body 15 inside which the sphere 14 can be displaced. In the case of a sphere, its possible displacement is a rotation about itself. A link 16 links the trackball 11 to the computer 13 and a link 17 links the computer 13 to the screen 12. The trackball 11 delivers to the computer 13 information, passing through the link 16, on the position of the sphere 14 relative to the body 15. The computer 13 is configured to display one or more objects 18 as well as a pointer 19 on the screen 12. The display of the objects 18 and of the pointer 19 is defined by the computer 13 and passes to the screen 12 via the link 17. In the example of FIG. 1, the objects 18 form rectangular buttons and the pointer 19 is represented by an arrow. Obviously, any other object and pointer shapes can be used. The position of the pointer 19 on the screen 12 is dependent on the information delivered by the trackball 11. An operator, whose hand 20 is represented, manipulates the sphere 14 to displace the pointer 19 on the screen 12 to reach an object 18. The body 15 can have an ergonomic shape intended to receive the palm of the hand 20. The operator manipulates the sphere 14 with the end of the fingers of his or her hand 20. The trackball 11 may comprise one or more buttons that the operator can also manipulate. In FIG. 1, a button 21 is represented. It can be accessed by the thumb of the hand 20. The button 21 can be used to select an object 18 on which the pointer 19 has been positioned by a displacement of the sphere 14.

Figure 2A:
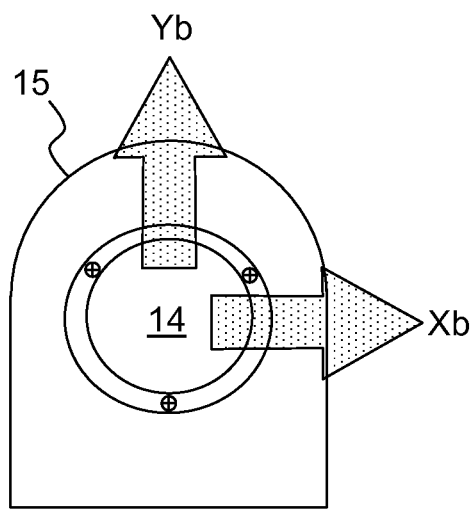
FIGS. 2a and 2b represent the correspondence between movements of a moving part of the trackball and those of a pointer displayed on the screen.
Figure 2B:
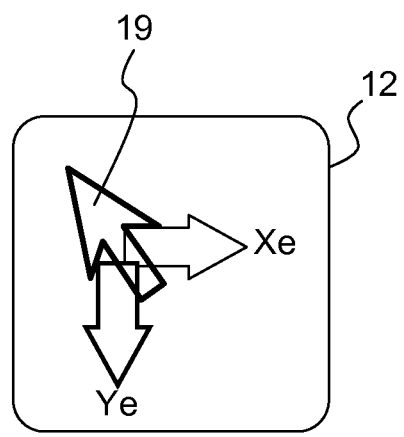

FIGS. 2a and 2b represent the correspondence between movements of the sphere 14 and those of the pointer 19 displayed on the screen 12. By convention, two axes Xb and Yb at right angles are defined, according to which the sphere 14 can be displaced. In practice, the displacements are angular movements of the sphere 14 in two planes at right angles each containing axes Xb and Yb. An axis Xe of the plane of the screen 12 is made to correspond to the axis Xb and, similarly, an axis Ye of the plane of the screen 12 is made to correspond to the axis Yb. The two axes Xe and Ye form a reference frame orthogonal to the screen 12. When the sphere 14 is displaced along the axis Xb, the pointer 19 is displaced along the axis Xe. Similarly, a displacement of the sphere 14 along the axis Yb generates a displacement of the pointer 19 along the axis Ye. In practice, any movement of the sphere 14 can be defined as a combination of movements along the two axes Xb and Yb which will be translated on the screen 12 by a movement in the reference frame Xe Ye. Advantageously, the correspondence between the movements of the sphere 14 and those of the pointer 19 is linear. More specifically, a proportionality is defined between the angular value of the displacement of the sphere 14 and the linear value of the translational displacement of the pointer 19 on the surface of the screen 12. This linear correspondence enables the operator to feel the effects of the precision in manipulating the pointer 19 on the screen 12.

One aim of the invention is to facilitate pointing to objects 18 displayed on the screen 12. To achieve this aim, the trackball 11 comprises means making it possible to exert a tangential force on the sphere 14. These means are driven by the computer 13 which is configured to modulate the tangential force applied to the sphere 14 according to the shape of the object 18 and the position of the pointer 19 relative to the object 18.

A first variant embodiment of the means making it possible to exert a tangential force on the sphere 14 is illustrated by FIGS. 3a, 3b and 4. In this variant, the tangential force is a braking force tending to oppose the displacements of the sphere 14. A friction of dry type, that is to say proportional to the amplitude of the displacement, is better suited to the ergonomy sought than a friction of viscous type, that is to say proportional to the speed of displacement.

The means making it possible to exert a tangential force on the sphere 14 comprise two rollers 26 and 27. The roller 26 is free in rotation, along the axis Xb and rubs against the sphere 14 along the axis Yb. Conversely, the roller 27 is free in rotation, along the axis Yb and rubs against the sphere 14 along the axis Xb. Each of the rollers 26 and 27 is held pressed against the sphere 14 by application of a force exerted on the corresponding roller at right angles to the surface of the sphere 14 along an axis 28 for the roller 26 and an axis 29 for the roller 27. This right angled force combined with the coefficient of friction between the roller 26 or 27 and the sphere 14 generates the tangential force sought in the direction in which the roller rubs against the sphere 14.

One example of means making it possible to obtain the force pressing the roller 26 against the sphere 14 is illustrated in FIG. 4 where the roller 26 is mounted in a cap piece 30. More specifically, the roller 26 retains a degree of freedom in rotation relative to the cap piece 30. The cap piece 30 has only a degree of freedom in translation relative to the body 15 along the axis 28. The cap piece 30 is pushed towards the sphere 14 by a spring 31 held compressed by an abutment 32. The compression of the spring 31 is modulated by displacing the abutment 32 in translation along the axis 28. The displacement of the abutment 32 can be obtained by means of a rotary motor 33 actuating a screw 34 cooperating with a tapping produced in the abutment 32. The abutment 32 has only a degree of freedom in translation relative to the body 15 along the axis 30. To ensure a fine adjustment of the displacement of the abutment 32, the rotary motor 33 can be of the stepper type.

Such a device makes it possible, through a control of the position of the stepper motor 33, to modulate the normal force on the roller 26 and consequently the tangential force on the sphere 14. Nevertheless, this variant presents the drawback of not simulating any return effect. Furthermore, for this variant, it is necessary to recalibrate the position law of the motors to take into account the wear of the rollers or the contamination of the surfaces in contact between the rollers and the sphere 14 for example by a greasy substance. These contaminations alter the coefficient of friction between the rollers and the sphere 14 and consequently influence the tangential force that the rollers apply to the sphere 14 in its displacements.

FIGS. 5a, 5b and 5c represent a second variant of means making it possible to exert a tangential force that can be modulated on the sphere 14 and that make it possible to simulate a return effect. In this variant, the tangential force is applied to the motor means belonging to the trackball and driven by the computer 13. In other words, the trackball 11 comprises motor drive means for driving the displacement of the sphere 14. The motor drive means generate a tangential force on the sphere 14 which is combined with the force exerted by the hand 20 of the operator. It is this combined force which allows for the displacement of the sphere 14 relative to the body 15.

The trackball 11 comprises a first roller 35 which can be driven in rotation about an axis 36 by a motor 37 as well as a second roller 38 which can be driven in rotation about an axis 39 by a motor 40. The axes 36 and 39 are at right angles. The rollers 35 and 38 are in the form of a wheel about their respective axis 36 and 39 and ensure a substantially one-off contact with the sphere 14. Thus, when the sphere 14 is driven in rotation about a first axis by one of the rollers, the latter does not hamper, or hampers very little, the rotation of the sphere about a second axis at right angles to the first axis. The motors 37 and 40 are torque-driven in order to generate a force feedback sensation. The operator can exert a reverse torque greater than the torque exerted by one of the motors and displace the sphere 14 in opposition to the torque exerted by the motor.

For this second variant, it is also necessary to recalibrate the position law of the motors to take into account the wear of the rollers or the contamination of the surfaces in contact between the rollers and the sphere 14 for example by a greasy substance.

Advantageously for the two variants, the trackball 11 comprises means for disengaging the means making it possible to exert a tangential force on the sphere 14. The disengaging means make it possible to use the trackball 11 even if blocking occurs. Furthermore, in the second variant where the means making it possible to exert a tangential force on the sphere 14 are motor-driven, the disengaging means are used in case of losses of electrical power supply to the motors 37 and 40.

The disengaging means can, for example, be formed by a framework in which are mounted the means making it possible to exert a tangential force on the sphere 14. This framework can be distanced from the sphere 14 by means of a cam which is in turn controlled by a lever located on the side of the body 15.

FIGS. 6a and 6b represent an alternative of the second variant in which a rotor of the motor-drive means is directly formed by the sphere 14. A plurality of permanent magnets 43 are arranged in the sphere and electromagnets 44 are arranged in the body 15. The driving of the electromagnets 44 makes it possible to apply a torque to the sphere 14.

The disengaging of the device is done simply by cutting the electrical power supply to the electromagnets 44. A manual control for this disengaging function is placed in proximity to the body 15.

There now follows a description of an example of correspondence between the force feedback felt by the operator when manipulating the trackball 10 and the shape of the objects displayed on the screen 12.

The aim is to reproduce in the fingers of the operator a force similar to that which would be felt by drawing his or her finger over relief objects drawn on the screen in the horizontal position by letting his or her hand bear with a constant weight.

A graphic interface is often made up of buttons and other objects representing metaphors of physical objects intended to indicate to the user that such and such is an area of the screen on which a selection action will have an effect.

It is possible, for example, to define a graphic charter in which objects displayed on the screen 12 are lit by a light source placed top left. A button 18 represented in cross section in FIG. 7b can be represented on the screen 12 as in FIG. 7a.

Figure 7A:
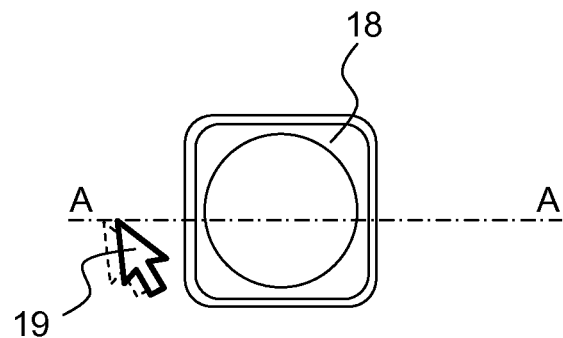
FIGS. 7a, 7b and 7c illustrate an example of correspondence between the tangential force and the shape of objects displayed on the screen.
Figure 7B:
Figure 7C:
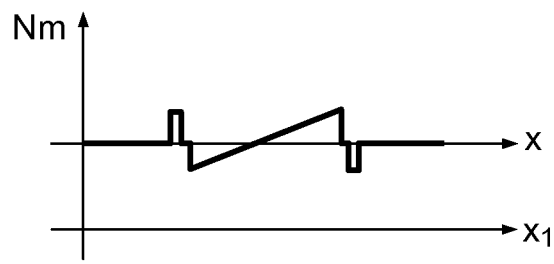

Such a button, if passed over by the end of the finger with a constant weight, along a line running from right to left, denoted AA in FIG. 7a, at a constant speed, would produce a lateral force as represented in FIG. 7c. The value of the force is given on the X axis and the Y axis of FIG. 7c is in agreement with FIG. 7b. The force curve represented in FIG. 7c is directly linked to a three-dimensional modelling of the object 18 which is passed over by the pointer 19. The lateral force is indicated in torque units (N.m) representing a torque applied to the sphere 14 that is reflected in a tangential force at the fingers of the operator compared to the large diameter of the sphere 14 relative to the size of the fingers of the operator.

A value of the tangential force is determined according to a three-dimensional modelling of a surface of the object 18. The modelling defines, for example, the different points of the surface of the object 18, an angular orientation of the surface of the object 18 relative to the plane of the screen 12. The points can be defined discretely for example at the intersection of rows and columns of a matrix of the plane of the screen 12. Each point forms, for example, a pixel of the screen 12.

Figure 8:
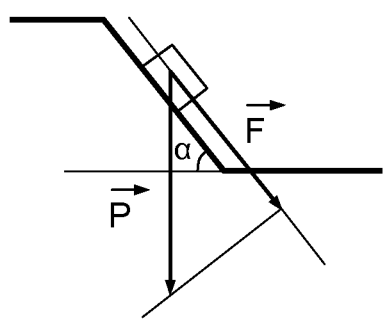
FIG. 8 represents an example of mathematical formulation of the tangential force.

It is possible to define a mathematical formulation of the force feedback giving satisfactory ergonomic sensations for the operator. An example of mathematical formulation is represented in FIG. 8 showing an enlarged area 50 of FIG. 7b. It is considered that the finger is sliding without friction with the imaginary surface of the screen 12. The finger is assigned a constant hypothetical weight $\vec{P}$. The tangential force $\vec{F}$ is directly linked to the weight $\vec{P}$ by the sine of an angle α that is formed locally, at the point where the pointer 19 is situated, by the surface of the object 18 in its three-dimensional modelling with the surface of the screen 12 which is assumed horizontal. In other words, the tangential force $\vec{F}$ changes according to the sine of the angle α that the surface of the object 18 forms with the plane of the screen 12.

The representation made using FIGS. 7c and 8 shows the trend of the tangential force during a displacement of the pointer 19 in a rectilinear direction. In the example represented, the direction is that of the axis AA in FIG. 7a. Obviously, the modelling takes account of any possible displacement of the pointer 19 in the plane of the screen 12. In the modelling example presented, it is possible to define for this purpose, for each point of the object 18, an orientation by means of a vector defined by components x and y in the plane of the screen 12 and a component z at right angles to the plane of the screen 12. To facilitate the calculations of the tangential force, this orientation vector is advantageously normed. In other words, $x^2+y^2+z^2=1$. It is thus possible to store only two of the coordinates, for example x and y.

It has already been seen that the definition of the orientation vector can be done discretely on the plane of the screen 12. Tests have shown that, for each of the vectors, an accuracy of eight bits on each of the coordinates x and y is sufficient, or two bytes per vector. For example, for a screen of 1024×768 pixels, the definition of the different orientation vectors uses approximately 1.5 megabytes (1024×768×2).

This memory occupancy is given for the graphic memory of the screen 12, a memory which is usually situated in the computer 13. Upstream of this graphic memory, it is possible to define objects 18 that can be displaced on the surface of the screen 12. It is possible, for example, to define a button as represented in FIG. 7a on an area of 64×64 pixels. The surface of the screen 12 without objects comprises, for each pixel, zero x and y components. When the aim is to place a button in a particular position of the screen 12, the zero x and y coordinates are locally replaced by the coordinates of the 64×64 pixels forming the area representing the button. It is thus possible to create dynamic images in which objects 18 are displaced with the image. A use of this type of dynamic image is useful in air navigation. A map background can scroll on the screen 12 according to the displacements of the aircraft and waypoints represented by objects 18 in relief are displaced on the screen with the displacement of the map. The objects 18 appear to be fixed relative to the map.

The tangential force $\vec{F}$ is applied to the sphere 14 by means of a torque generated by the motors described above. The torque is oriented along a vector at right angles to the vector representing the tangential force. A sign convention is applied to obtain a coherent force feedback. For example, for a hollow, dish-shaped button as represented in FIGS. 7a and 7b, a displacement from the edge of the button towards its centre generates decreasing negative torque which reaches a zero value at the centre of the dish. The negative torque tends to drive the sphere 14 towards the bottom of the dish.

It is possible to leave the sphere 14 free of its movements in the absence of any object 18 passed over by the pointer 19. An example of tangential force curve is given in FIG. 7c where the horizontal axis is the X axis. The tangential force is distributed on either side of the X axis. This nevertheless presents difficulties in cases of vibrations undergone by the equipment 10. In the absence of any object 18 or when an object 18 comprises a horizontal planar surface, no tangential force is exerted on the sphere 14 and the latter can be displaced slightly in line with vibrations without any action from the operator. These vibrations may be due to turbulences undergone by the equipment 10. In an implementation of the equipment 10 on board an aircraft, turbulences are inevitable and, to limit their effects, the modulated tangential force advantageously has added to it a constant force. This force represents a dry friction applied to the sphere 14 in its displacements. This force can be obtained mechanically, for example by means of brushes rubbing against the sphere 13 or else through the motors of the trackball 11. An example of tangential force curve is given in FIG. 7c where the horizontal axis is the axis X1. The tangential force is offset by a value separating the axes X and X1. The tangential force is permanently positive. The modulation of the tangential force according to the shape of the object obviously remains present.

In addition to the added constant force, it is possible to increase the effects of attraction according to the vibration level. More specifically, it is possible to increase the amplitude of the variations of the tangential force when turbulences occur. The variations of the tangential force are defined in tests. These variations make it possible to have a movement that is more fluid in stable conditions and more accurate in vibratory or turbulent conditions.

Advantageously, the equipment 10 is intended to be installed on a carrier, such as, for example, an aircraft. The equipment 10 comprises means for measuring a level of turbulence of the carrier. The computer 13 is configured to adjust the amplitude of the tangential force as a function of the level of turbulence measured. In other words in FIG. 7c, it is possible to adjust the difference between the axes X and X1 and, more generally, to modulate the constant force added to the tangential force. This modulation is a function of time. At a given instant, the added force is constant over the entire surface of the screen 12. More specifically, this difference is increased when the level of disturbance measured increases.

The means for measuring a level of turbulence may comprise an accelerometer measuring the acceleration of the carrier. On board an aircraft, a choice will, for example, be made to measure a vertical acceleration that is a good representation of usual turbulences. It is also possible to measure the turbulences on three axes of an orthogonal reference frame in order to improve the accuracy of the measurement.

The estimation of the level of turbulence can be done by measuring the power spectral density of the signal at the output of an accelerometer, or that of the sum of the output signals when there is a plurality of accelerometers. This spectral density is then filtered by a high-pass filter. This acceleration measurement can be obtained from inertial units that are generally installed on board the aircraft or from accelerometers formed from micro-machined components placed in the equipment 10.

The movements of the sphere 14 are therefore generated by a number of causes: the action of the operator, the tangential force, the residual frictions due to the mechanical displacement of the sphere 14 relative to the body 15 as well as the inertia of the sphere 14.

The inertia is a parameter to be taken into account if the aim is to enable the user to rapidly displace the sphere 14 without being confronted with a succession of "dips" and "bumps" against which it can abut. Dips and bumps should be understood to be variations of tangential force when the pointer 19 passes over an object 18. These variations give sensations of dips and of bumps and, more generally, of obstacles to be crossed for the operator when displacing the sphere 14. Advantageously, a kinetic moment of the sphere 14 that is a function of the rotation speed of the sphere 14 is generated. This kinetic moment is calibrated so that the sphere 14 crosses the obstacles due to the variations of tangential force when the speed of rotation of the sphere 14 reaches a given value. In other words, the kinetic moment can facilitate the rotation of the sphere 14 in opposition to the action of the modulation of the tangential force.

This kinetic moment can be obtained by adapting the weight or the distribution of weight of the sphere 14 itself or by introducing into the calculation of the tangential force a pseudo-inertia term tending to reduce the frictions and/or the amplitude of the tangential force variations.

The invention claimed is:

1. A computer equipment configured to be installed on a carrier, the computer equipment comprising:
   a trackball including a body, a moving part configured to be displaced inside of the body, and a means making it possible to exert a tangential force on the moving part;
   a screen;
   a computer; and
   a means for measuring a level of turbulence of the carrier,
   wherein the trackball delivers information including a position of the moving part relative to the body to the computer,
   wherein the computer is configured to:
      display at least one object on the screen,
      display a pointer in a position on the screen according to the information delivered by the trackball,
      drive the means making it possible to exert the tangential force on the moving part,
      modulate the tangential force according to a shape of the at least one object and a position of the at least one object on the screen relative to the position of the pointer on the screen, and
      adjust the amplitude of the tangential force according to the level of turbulence measured, and
   wherein the tangential force is permanently positive.

2. The computer equipment according to claim 1, the trackball comprising means for disengaging the means making it possible to exert the tangential force on the moving part.

3. The computer equipment according to claim 1, wherein the tangential force is a braking force tending to oppose the displacements of the moving part.

4. The computer equipment according to claim 1, the tangential force being applied to by a motor means belonging to the trackball and driven by the computer.

5. A method for driving computer equipment according to claim 1, consisting in determining a value of the tangential force according to a three-dimensional modelling of a surface of the object, the modelling defining, for different points of the surface of the object, an angular orientation of the surface of the object relative to a plane of the screen, and the tangential force changing according to the sine of the angle that the surface of the object forms with the plane of the screen.

6. The method according to claim 5, the tangential force changing proportionally to a constant hypothetical weight applied to the object at right angles to the plane of the screen and to the sine of the angle that the surface of the object forms with the plane of the screen.

7. The method according to claim 6, wherein a constant force representing a constant dry friction applied to a sphere in its displacements is added to the modulated tangential force.

8. The method according to claim 6, the constant force on the surface of the screen being modulated according to measurements of turbulences.

9. The method according to claim 5, wherein a kinetic moment of the sphere that is a function of the rotation speed of the sphere is generated, the kinetic moment being able to facilitate the rotation of the sphere in opposition to the action of the modulation of the tangential force.

\* \* \* \* \*